(12) United States Patent
Oh

(10) Patent No.: US 7,110,333 B2
(45) Date of Patent: Sep. 19, 2006

(54) DISK PLAYER

(75) Inventor: Cheol-Gyun Oh, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 409 days.

(21) Appl. No.: 09/985,154

(22) Filed: Nov. 1, 2001

(65) Prior Publication Data

US 2002/0105869 A1   Aug. 8, 2002

(30) Foreign Application Priority Data

Feb. 6, 2001   (KR) ................................ 2001-5723

(51) Int. Cl.
G11B 7/00         (2006.01)
(52) U.S. Cl. .................. 369/47.22; 369/53.34
(58) Field of Classification Search ............ 369/47.22, 369/47.28, 47.27, 47.31, 47.23, 47.48, 53.34, 369/53.35
See application file for complete search history.

(56) References Cited

U.S. PATENT DOCUMENTS

| 6,081,490 A | 6/2000 | Kuroda et al. | |
| 6,091,682 A * | 7/2000 | Hikima | 369/47.2 |
| 6,137,756 A * | 10/2000 | Yoshida et al. | 369/53.36 |
| 6,341,110 B1 * | 1/2002 | Tawaragi | 369/47.2 |
| 6,552,983 B1 * | 4/2003 | Yoshida et al. | 369/53.12 |
| 6,556,523 B1 * | 4/2003 | Masui | 369/47.28 |
| 6,594,215 B1 * | 7/2003 | Moriwaki | 369/53.35 |

2001/0026515 A1   10/2001   Mochizuki et al.

FOREIGN PATENT DOCUMENTS

| EP | 0 872 838 A2 | 10/1998 |
| EP | 0 945 866 A2 | 9/1999 |
| EP | 0 967 612 A2 | 12/1999 |
| EP | 0 977 191 A2 | 2/2000 |
| JP | 2000-331411 A | 11/2000 |
| JP | 2001-176069 A | 6/2001 |
| JP | 2001-236738 A | 8/2001 |

OTHER PUBLICATIONS

JP 2000076655 English Abstract dated Mar. 14, 2000.

* cited by examiner

Primary Examiner—Andrea Wellington
Assistant Examiner—Jorge L. Ortiz-Criado
(74) Attorney, Agent, or Firm—Sughrue Mion, PLLC

(57) ABSTRACT

The present invention discloses a disk player for recording information on a disk and/or reproducing recorded information thereon. The disk player includes a wobble detection unit for detecting a wobble signal corresponding to a wobbling pattern formed along a track of the disk; and an information processing unit for detecting a pre-pit signal recorded on the disk using the wobble signal output from the wobble detection unit and a clock signal obtained by multiplying the wobble signal a predetermined number of times, and for processing the information recorded on the disk or the information to be recorded thereon according to the detected pre-pit signal. Since the detection of a synchronization signal can be performed more precisely, this disk player can reduce error in the recording and reproduction of data.

18 Claims, 11 Drawing Sheets

DISK PLAYER

BACKGROUND OF THE INVENTION

1. Field of the Invention

The present invention relates to a disk player, and more particularly, to a disk player for accurately detecting pre-pit data recorded on a disk.

2. Description of the Related Art

Optical recording media (hereinafter referred to as "a disk") include read-only CD-ROMs and DVD-ROMs, once-write-type CD-Rs and DVD-Rs, rewritable CD-RWs and DVD-RWs, and the like.

The DVD-R or DVD-RW disk is divided into a plurality of sectors, each sector including a data region for recording data of a user and an identification (ID) region having recorded position information. In addition, lands and grooves formed along tracks of the disk are formed in a wobbling shape. A player for recording information on such a disk or reproducing the information recorded on the disk can generate a wobble signal corresponding to the wobbling shape from a light irradiated onto a track of the disk and picked up therefrom. Moreover, the detection of data contained in the picked up light is synchronized by use of this wobble signal.

However, if a pre-pit signal recorded on an identification region is not precisely detected under the effect of a change in a clock signal used for data reading, a change in the revolution number of a spindle motor, a change in linear speed due to the eccentricity of a disk, etc., an error may occur in data recording or reproduction.

SUMMARY OF THE INVENTION

Accordingly, it is a primary object of the present invention to provide a disk player which can reduce error in data reading or reproduction by precisely detecting a pre-pit signal recorded on a disk.

In order to achieve the above-described object of the present invention, there is provided a disk player, which records information on a disk and/or reproduces recorded information, including: a wobble detection unit for detecting a wobble signal corresponding to a wobbling pattern formed along a track of the disk; and an information processing unit for detecting a pre-pit signal recorded on the disk using the wobble signal output from the wobble detection unit and a clock signal obtained by multiplying the wobble signal a predetermined number of times, and for processing the information recorded on the disk or the information to be recorded thereon according to the detected pre-pit signal.

Preferably, the information processing unit includes: a reproduction signal processing unit for converting a reproduction signal picked up from the disk into a digital signal; and a signal control unit for generating a window at the detection of a pre-pit signal corresponding to the wobble signal output from the wobble detection unit and the clock signal, picking up data output from the reproduction signal processing unit during window generation, and correcting the picked up data in correlation with the picked up data.

The signal control unit includes: a data detection unit for picking up a signal from the reproduction signal processing unit to output the same; a synchronization detection unit for detecting a synchronous signal from data output from the data detection unit; and a synchronization protection processing unit for outputting a synchronization lock signal if a synchronous signal output from the synchronization detection unit is normally generated as much as an established number of times; and a correlation address control unit for controlling address information corresponding to a value output from the data detection unit, according to the synchronization lock signal.

In addition, the signal control unit further includes: a data conversion unit for decoding a signal output from the data detection unit to output the same to the correlation address control unit; and a data processing unit for processing data output from the data conversion unit in a recording format.

The data conversion unit outputs a code of three bits as the corresponding single bit.

The correlation address control unit controls a detected address value to conform to an established increasing pattern when the synchronization lock signal is maintained.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A disk player in accordance with a preferred embodiment of the present invention will now be described in detail with reference to the accompanying drawings.

Figure 1:
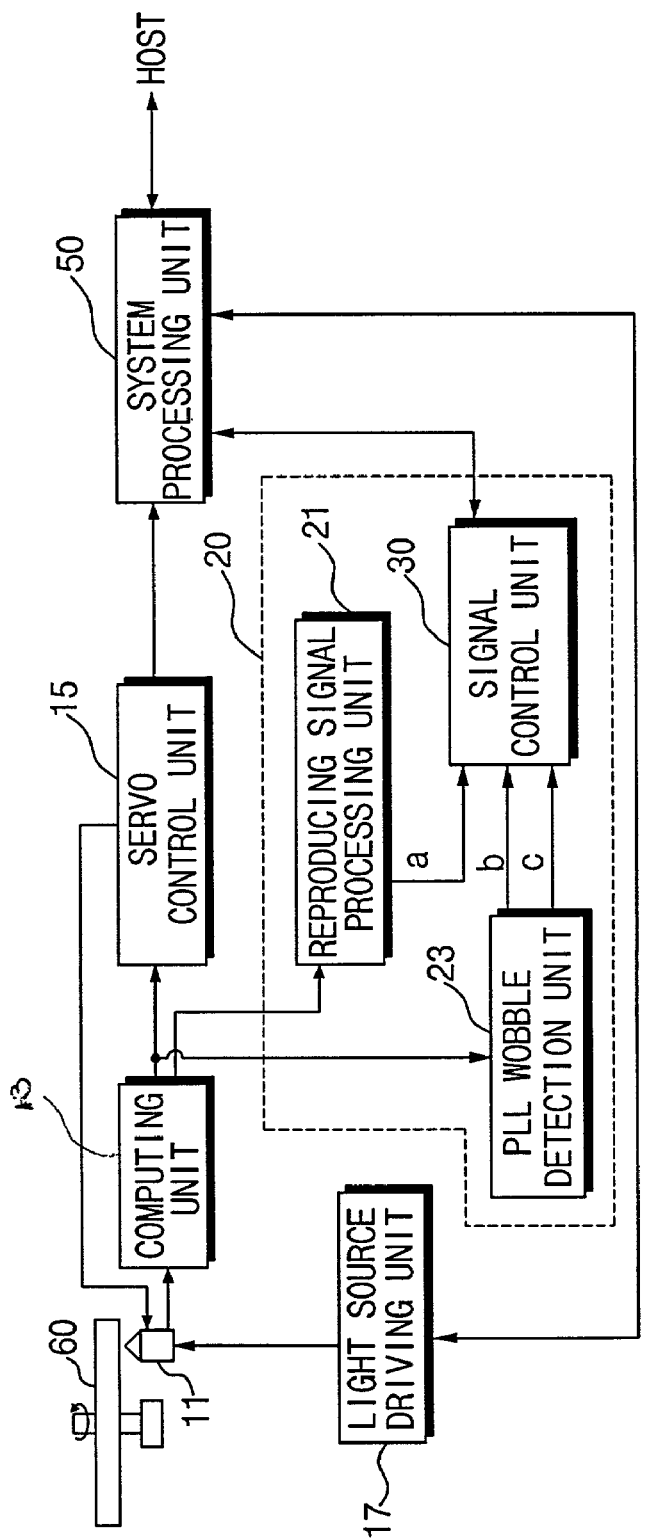
FIG. 1 is a block diagram illustrating a disk player in accordance with the present invention.

FIG. 1 is a block diagram illustrating a disk player in accordance with the present invention.

Referring to the drawing, the disk player includes an optical pickup 11, a servo control unit 15, a light source driving unit 17, an information processing unit 20, and a system processing unit 50.

The light source driving unit 17 drives a light source (not shown) so that a light is irradiated on a disk 60 according to a recording mode or reproduction mode.

The optical pickup 11 irradiates a light on the disk, and picks up the light reflected from the disk 60. Usually, the optical pickup 11 has a plurality of optical detectors, and outputs a signal corresponding to the light picked up from each optical detector.

A computing unit 13 outputs an error signal for servo control, a wobble reproducing signal, and an information reproducing signal through a computing process for generating a required signal, such as subtracting or adding a signal output from each optical detector.

The servo control unit 15 controls the optical pickup 11 according to the error signal for servo control, that is, a focus error signal and a track error signal, in order to reduce an error.

The reproducing signal processing unit 21 outputs a digital signal (a) generated by sampling an information reproducing signal output from the computing unit at an established sampling rate.

A PLL wobble detection unit 23 performs PLL (phase loop lock) for an analog wobble reproducing signal output in correspondence with a wobbling shape of the disk 60, and outputs a square wave PLL_wobble signal (c) upon a phase synchronization. In addition, the PLL wobble detection unit 23 generates a clock signal (b) obtained by multiplying a frequency of the PLL_wobble signal a predetermined number of times to thus output the same. Preferably, the clock signal is generated as a signal obtained by multiplying the PLL_wobble signal 186 times.

The system processing unit 50 outputs a signal output from the signal control unit 30 to a host (not shown), for example, a computer. In case of recording, it controls the optical source driving unit 17 using the address information of pre-pit data output from the signal control unit 30 so that user data is recorded on the disk.

The signal control unit 30 generates a window for detecting land pre-pit data from the square wave PLL_wobble signal and the clock signal, detects a signal output from the reproducing signal processing unit 21 during a window generation interval, and corrects an error of a detected data by analyzing continuity between detected signals.

Figure 2:
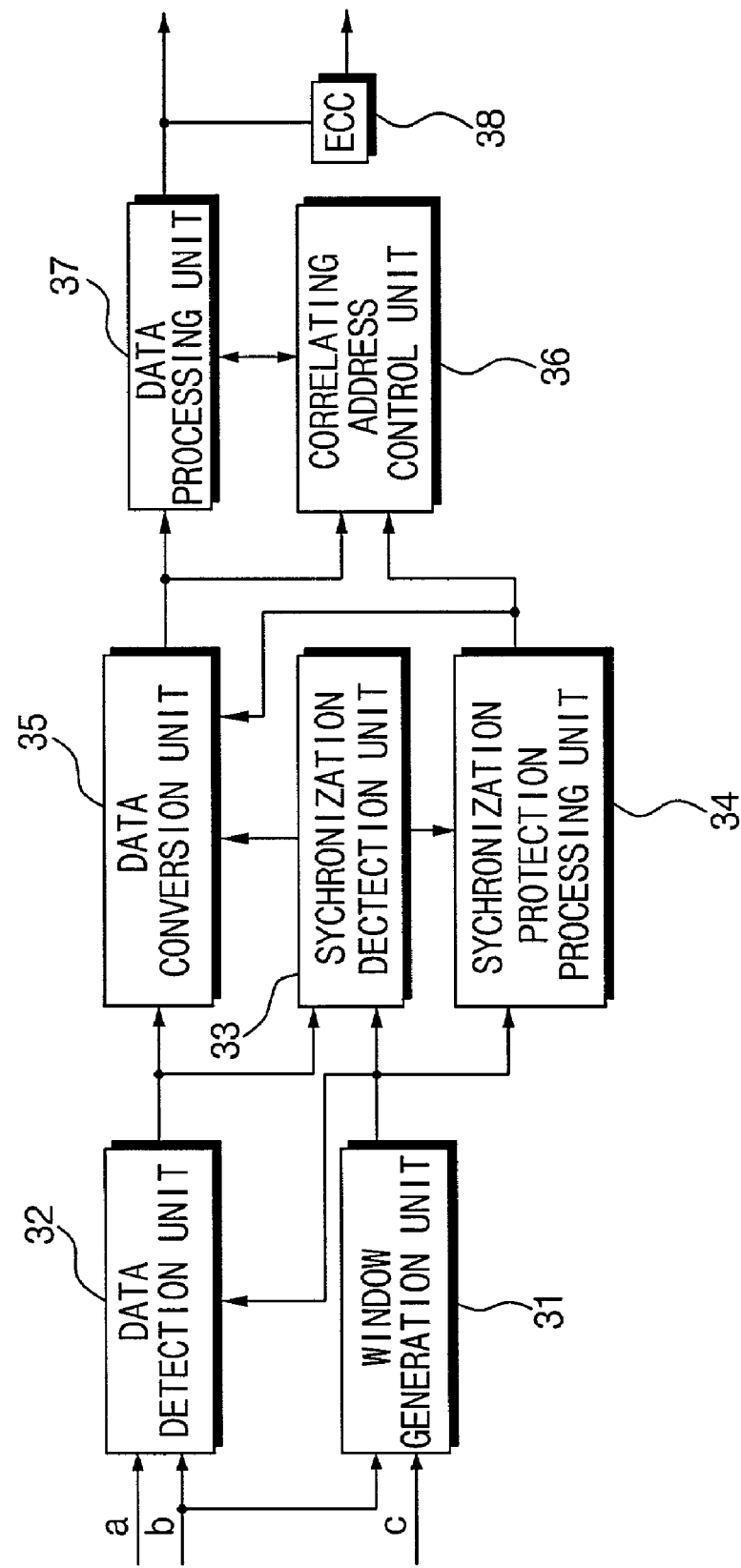
FIG. 2 is a block diagram illustrating the construction of a signal control unit of FIG. 1 in accordance with an embodiment of the present invention.

This will be described in more detail with reference to FIG. 2, illustrating the construction of the signal control unit 30 in accordance with the preferred embodiment.

Referring to the drawing, the signal control unit 30 includes a window generation unit 31, a data detection unit 32, a data conversion unit 35, a synchronization detection unit 33, a synchronization protection unit 34, a correlation address control unit 36, and a data processing unit 37.

The window generation unit 31 generates a window signal for detecting pre-pit data from data output from the reproducing signal processing unit 21 using the PLL_wobble signal (c) output in a square wave and the clock signal (b) obtained by multiplying the PLL_wobble signal (c).

Preferably, the window generation unit 31 counts the clock signal (b) in synchronization with the rising edge of the PLL_wobble signal (c), and generates a window signal for detecting pre-pit data, upon reaching a predetermined count value. When a clock that has been multiplied 186 times is generated with respect to a unit cycle PLL_wobble signal (hereinafter, referred to as "wobble"), a window signal is generated when a clock count value corresponds to a pre-pit recording interval. Preferably, a window corresponding to the pre-pit recording interval it is generated. For instance, a pre-pit recording position conforms to a clock count 139, a window signal is generated when the count value is 139, or between 138 and 140. The window width is properly set considering the recording interval allocated for a recording unit bit.

Figure 3:
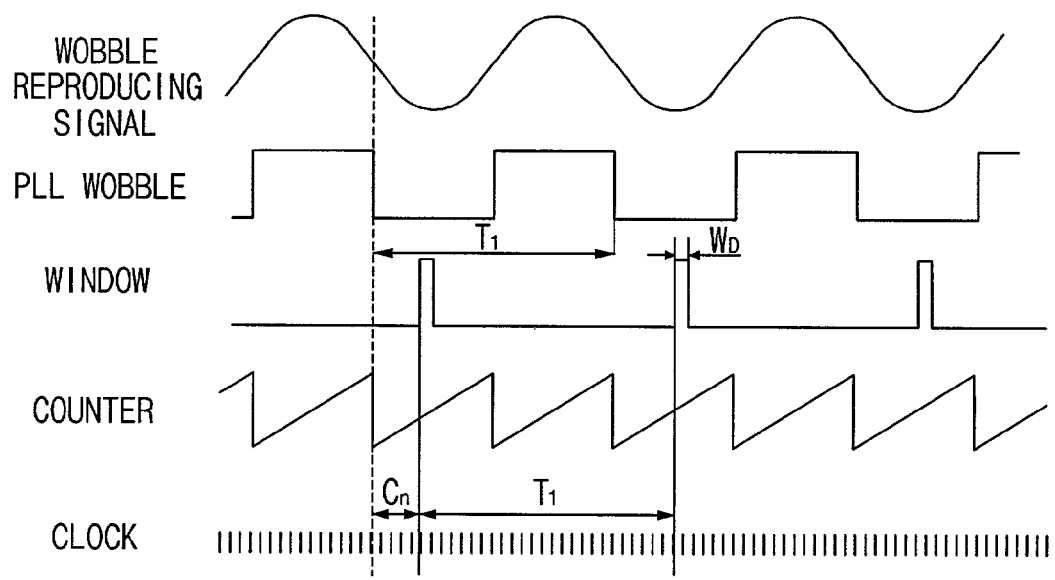
FIG. 3 is a timing diagram illustrating the generation of a window signal for detecting a pre-pit signal using a PLL_wobble signal and a clock signal.

FIG. 3 is a timing diagram illustrating the generation of a window signal for detecting a pre-pit signal using a PLL_wobble signal and a clock signal.

Referring thereto, the counter of the window generation unit 31 counts clocks as it is reset to the edge of the PLL_wobble signal, and a window is generated for each wobble cycle when the count value reaches a set value.

The window is preferably generated to have a width of a clock cycle or a width two times larger than a clock cycle.

In this embodiment, the window generation unit 31 counts clocks while resetting each edge of a square wobble signal. Then, after resetting counter in synchronization with the rising edge, it generates a window when a set value is reached. This method involves the use of a counter of which the maximum countable value is smaller than the number of clocks corresponding to the cycle of a wobble signal. Differently, the window generation unit 31 can generate a window at an interval corresponding to a pre-pit recording position using a counter capable of counting more than the number of clocks corresponding to the cycle of a wobble signal, while resetting the counter for each rising edge of a wobble.

The data detection unit 32 detects land pre-pit data in synchronization with a clock signal during the interval in which a window signal is generated, and outputs the result of the detection.

The synchronization detection unit 33 detects a synchronization signal from signals output from the data detection unit 32. Here, the synchronization signal refers to an encoded signal with multi-bits, which include an even synchronization signal and an odd synchronization signal.

Figure 4:
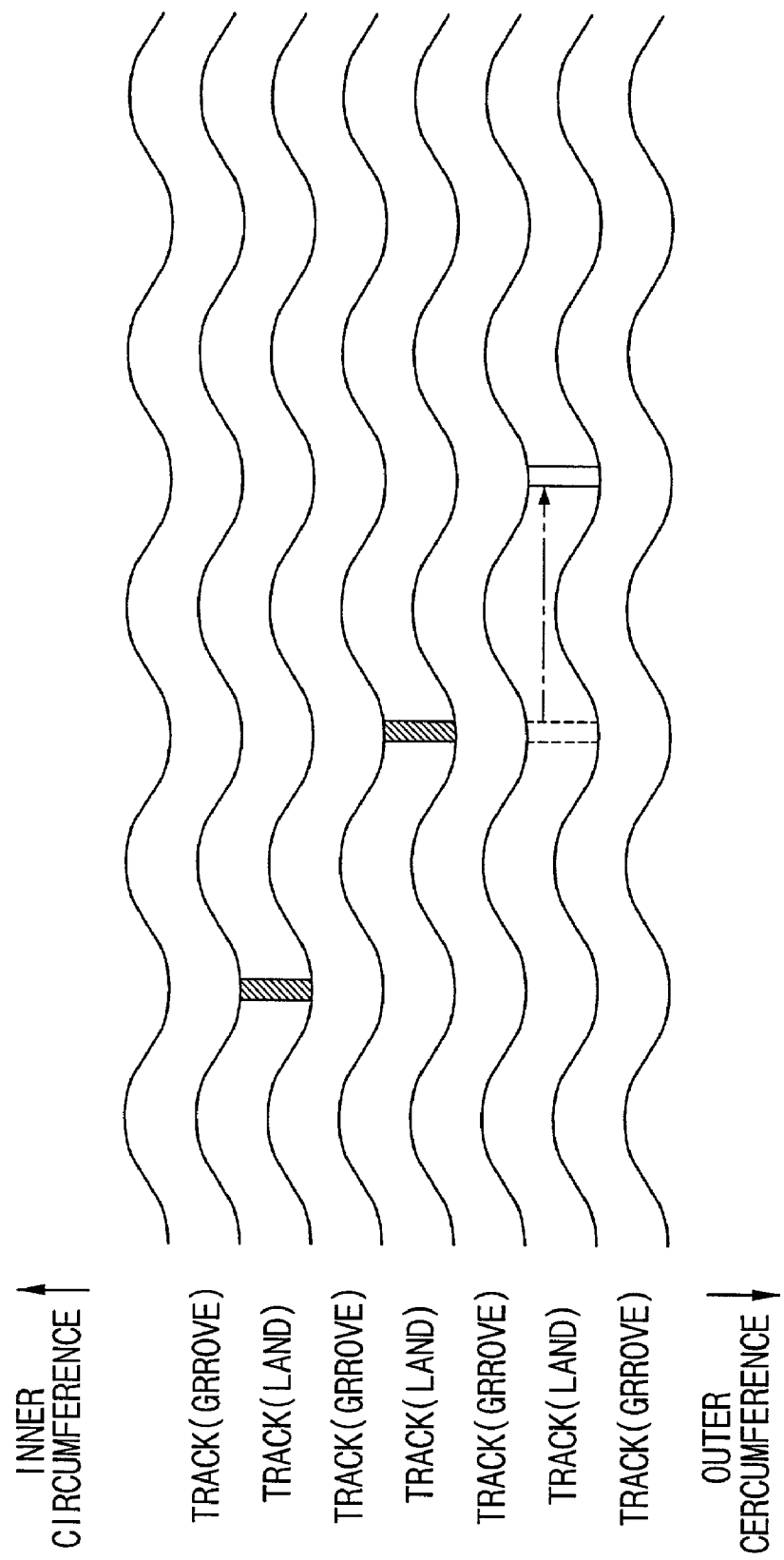
FIG. 4 is a plan view illustrating parts of a disk in order to explain a method of recording a pre-pit synchronization signal along a track of the disk.

A pre-pit synchronization signal will be described in more detail with reference to FIG. 4.

Referring to the drawing, grooves and lands are sequentially arranged from the inner circumferential side toward the outer circumferential side.

When a synchronization signal is recorded on an identifier region (ID region) along a track from the inner circumferential side toward the outer circumferential side, the recording is performed by using heterogeneous synchronization signals (even synchronization signal and odd synchronization signal) so that a pre-pit synchronization signal is not positioned with respect to an adjacent track in the same direction. In other words, when lands and grooves are repeatedly formed from the inner circumferential side toward the outer circumferential side, and the position of the even synchronization signal to be followed has the same direction as the even synchronization signal formed on the adjacent track, the position of the even synchronization signal is moved the distance of a set interval, and the odd synchronization signal is recorded on this position. The portion having oblique lines is a portion on which the even synchronization signal is recorded. The position marked with dotted lines corresponds to the recording position of the next even synchronization signal, it has the same direction as the previous track. Thus, the odd synchronization signal is recorded on the position directed by an arrow that is one-frame-shifted before the recording position by one frame. In the same manner, if the previously recorded odd synchronization signal has the same direction as the position of the next odd synchronization signal to be recorded, the even synchronization signal is recorded on the position that is one-frame-shifted before the next position to be recorded.

The even synchronization signal and the odd synchronization signal are represented as a code of a combination of different bits. For example, one bit signal is recorded with respect to one wobble, and three bit signals sequentially recorded on three wobbles become a single synchronization signal code.

Figure 5:
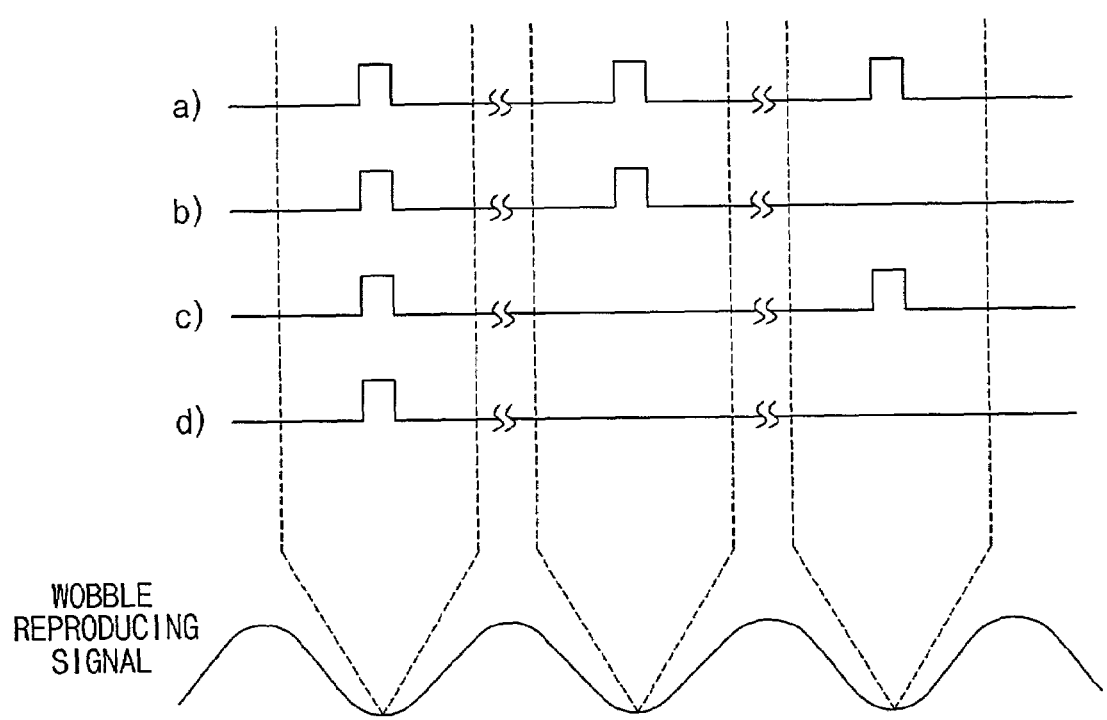
FIG. 5 is a partial extended waveform view illustrating an even synchronization signal and an odd synchronization signal recorded on a disk in a code format in relation to a wobble signal.

Referring to FIG. 5, a) represents a code of the even synchronization signal, which is recorded on three wobbles in 111 bits. The odd synchronization signal is represented as a code of 110 bits as shown in b). Signals c) and d) are examples of representing a pre-pit data value 1 of a synchronization signal as code 101, and representing a data value 0 as code 100, respectively.

Meanwhile, in the recording method of a disk adapted to the disk player of the present invention, a single ECC block consists of 16 sectors, each sector consisting of 26 frames, each frame consisting of signals recorded on eight wobbles.

Figure 6:
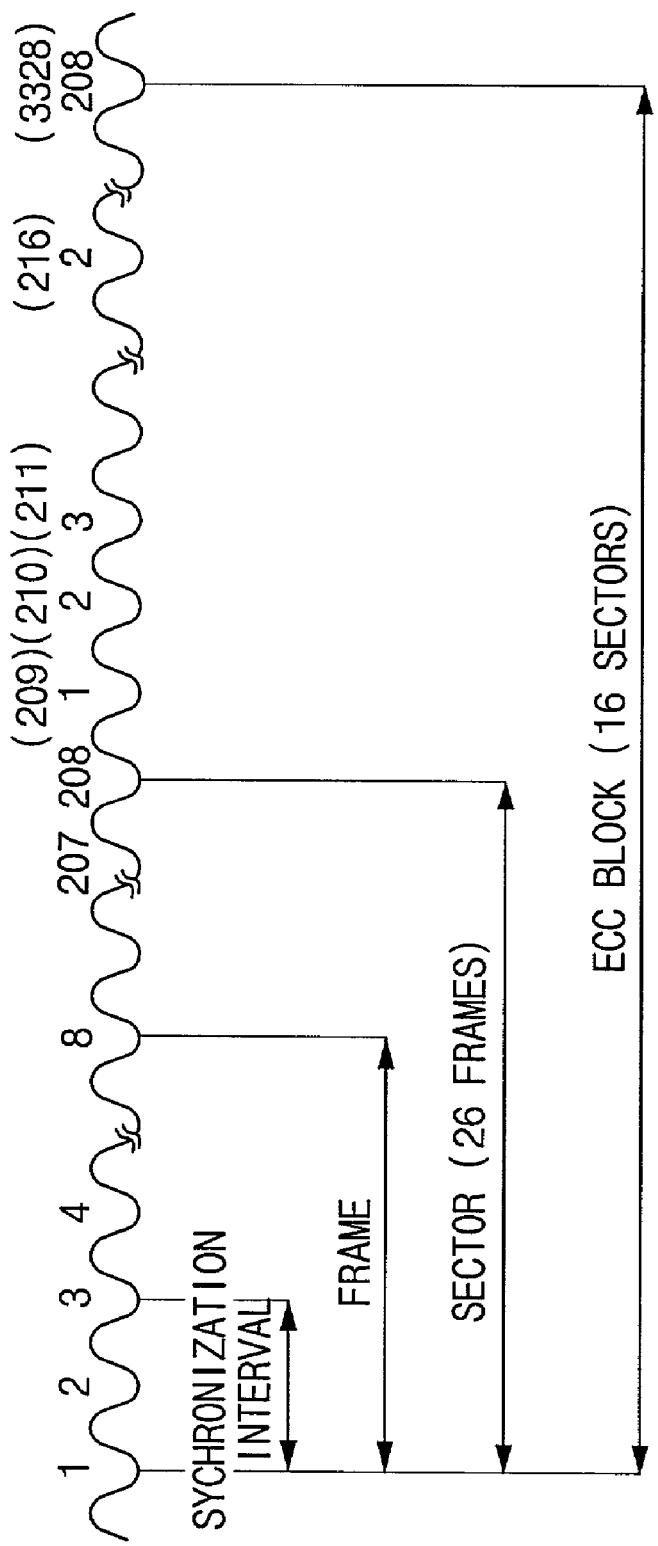
FIG. 6 is a view illustrating a data structure related to a number of wobbles.
Figure 7:
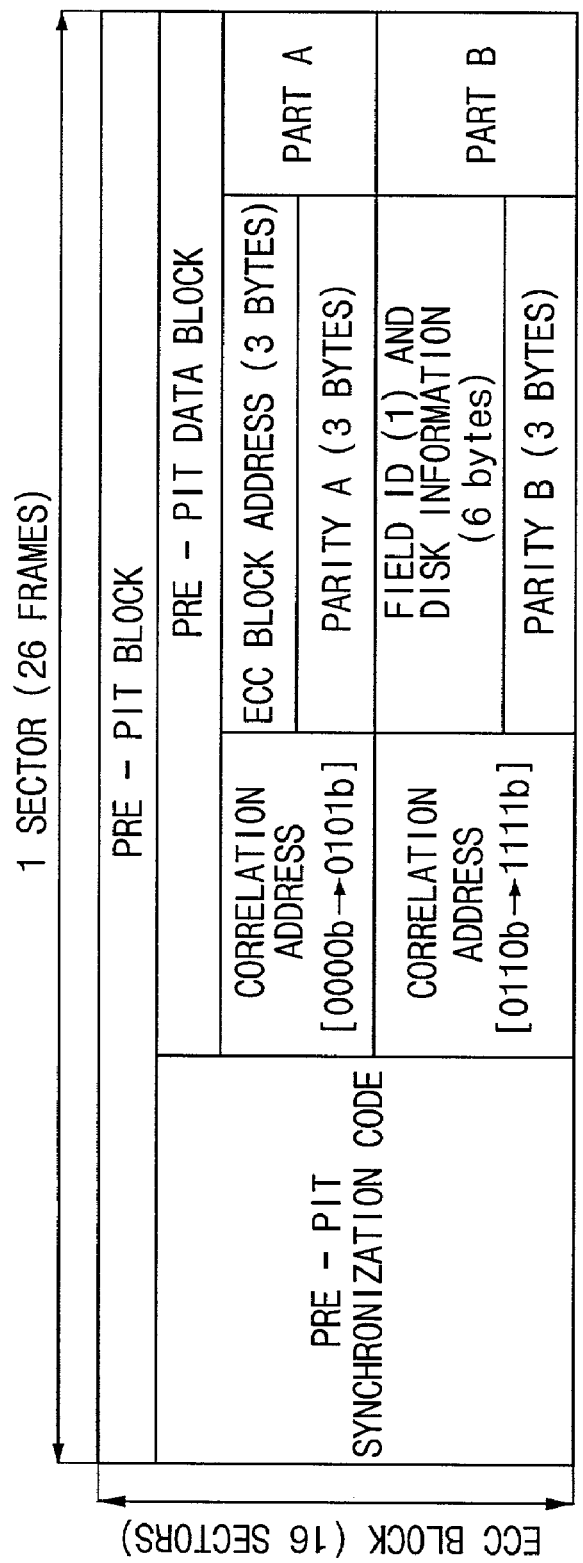
FIG. 7 is a view illustrating a data structure comprising a unit ECC block.

With respect to this data recording method, FIG. 6 is a view illustrating a data structure related to a number of wobbles. FIG. 7 is a view illustrating a data structure comprising a unit ECC block consisting of 16 sectors.

By this pre-pit recording method, the synchronization detection unit 33 detects a pre-pit synchronization signal with respect to the disk 60 having recorded data.

The synchronization detection unit 33 outputs the detected synchronization signal data by analyzing data output from the data detection unit 32 during a window generation interval. In other words, the synchronization detection unit 33 outputs a three-bits signal detected for three wobbles corresponding to the pre-pit synchronization signal recording interval of the disk 60.

The synchronization protection processing unit 34 processes a signal output from the synchronization detection unit 33. For example, when an even synchronization signal is recorded on the disk 60 as a code of 111 bits, and an odd synchronization signal is recorded thereon as a code of 110 bits, the synchronization protection processing unit 34 determines the type of synchronization signal by determining if the signal output from the synchronization detection unit 33 is 111 or 110.

In addition, when an even synchronization signal is generated, the synchronization protection processing unit 34 determines if "1" is detected from any one of three bits of the even synchronization signal at the start position of the next sector. If any one of three bits of the even synchronization signal contains "1" at the start position of the next sector, it is corrected to a even synchronization signal.

On the contrary, if "1" is not detected from any one of three bits of the start position of the next sector, the detecting position is further one-frame-shifted to thus search for an odd synchronization signal.

In the same way, when an odd synchronization signal is generated in the previous sector, an even synchronization signal is searched for in 25 frames of the present sector that is one-frame-shifted beforehand to 26 frames that is a sector interval. If "1" is detected from any one bit of the position of the even synchronization signal, it is judged to be an even synchronization signal. On the contrary, if "1" is not detected from any one bit of 3-bits of data at this position, the detecting position is one-frame-shifted to thus search for an odd synchronization signal.

The synchronization protection processing unit 34 determines a lock or unlock by judging if a synchronization signal output from the synchronization detection unit 33 is normally input for the period of a set number of times.

That is, the synchronization protection processing unit 34 generates a synchronization lock signal when the synchronization signal is input from a normal detection position with respect to continuous two or three sectors.

The synchronization protection processing unit 34 receives a signal output from the data detection unit 32 at each detection interval of a synchronization signal which is expected after a synchronization lock, and performs the processing of the received data in consideration of a bit error ratio. That is, even when an error occurs to any one of three bits of a code signal output from the synchronization detection unit 33 in the synchronization lock state, the synchronization protection processing unit 34 corrects this error to thus judge the same as the corresponding synchronization signal. In other words, when an error occurs to any one of three bits of data input at the detection time of an even synchronization signal in the synchronization lock state, a possible combination of bits 011, 101, 110 is judged to be an even synchronization code of 111 bits. In the same way, when an error occurs to any one of three bits of data inputted at the detection time of an odd synchronization signal in the synchronization lock state, a possible combination 010, 100, 111 is judged to be an odd synchronization code.

The data conversion unit 35 converts three-bits of data detected at an interval of two frames after the synchronization signal generation, into the corresponding value of 1 bit, i.e., 0 or 1, as shown in FIG. 5c through 5d to thus output the same.

When an error occurs to any one bit of a data value 1 represented as a code 101 of three bits in the synchronization lock condition, the data conversion unit 35 judges a possible combination of bits 001, 111, 100 as 101. In the same way, when an error occurs to any one bit of code 100 corresponding to a data value 0, the corresponding combination of bits 000, 110, and 101 is judged as 100.

With respect to data recorded in 8 frames following the synchronization code recording region, the correlation address control unit 36 detects an address value from 4-bits data output from the data conversion unit 35.

When a synchronization lock signal is input, the correlation address control unit 36 corrects and outputs it so that continuity is maintained if the next address value deviates from continuity.

Even the correlation address value infringes continuity, the correlation address control unit 36 makes the correlation address value have sequentially increasing continuity, that is, it outputs an address value obtained by adding 1 to the previous correlation address value. The correlation address control unit 36 resets an internal counter for reading address information upon unlocking synchronization whenever the synchronization signal is detected.

The correlation address control unit 36 produces and outputs an address value by this process. If the address value output from the correlation address control unit 36 is currently 15, subsequent address values are used for a new ECC block.

The data processing unit 37 receives a correlation address value from the correlation address control unit 36, and processes data recorded in subsequent frames.

The data processed and output by the data processing unit 37 is corrected to a unit of 16 sectors by the error correction unit (ECC) 38 performing an error correction to be output to the system processing unit 50.

FIGS. 8 through 11 illustrate an example of a signal processing process of the signal control unit.

Figure 8:
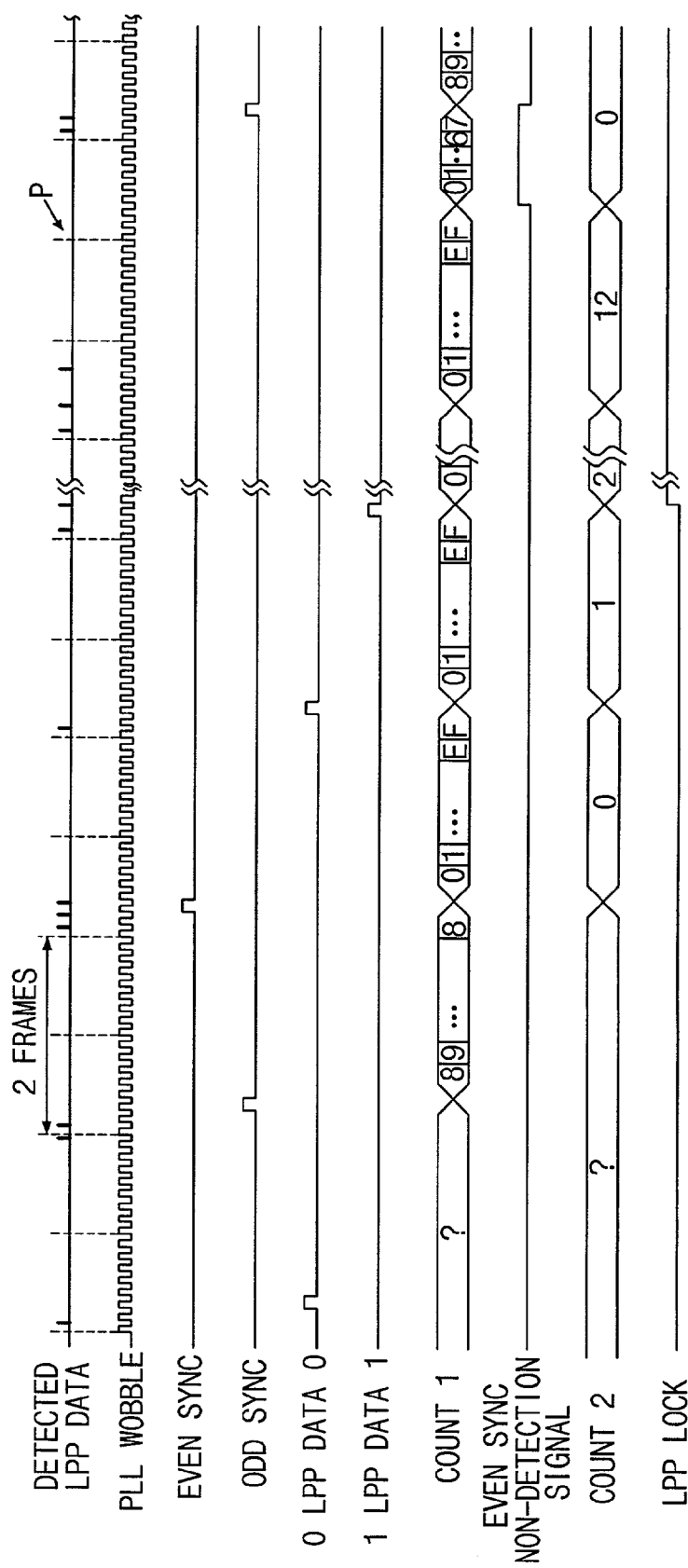
FIG. 8 is a timing diagram explaining one example of a signal processing process in the signal control unit of FIG. 2.

FIG. 8 is a timing diagram explaining one example of a signal processing process in the signal control unit 30 of FIG. 2.

As shown therein, in regard to a window (not shown) generated in synchronization with PLL_wobble signal, land pre-pit(LPP) data 110 is generated before and after a third frame, and the synchronization protection processing unit 34 generates an odd sync. This synchronization signal corresponds to a signal that cannot be presently confirmed. Afterwards, a data detected after a second frame is 111, and accordingly an even sync is generated.

Thereafter, "1" is not detected from three bits of the expected position(P; 12-th interval of count 2) of the even sync which is 26-th frame after the even sync generation position. Therefore, an even sync non-detection signal for searching for an odd sync is generated internally, and the odd sync is generated at the detection of the odd sync. In this case, it can be known that the previous even sync is an accurate value, and the resulting processing is performed.

In the drawings, a value of count 1 is counted at an interval of 2 frames. In detail, counting is started from 0 upon the generation of an even sync signal, while the counting is started from 8 upon the generation of an odd synchronization signal. This is to accurately judge an interval between synchronization signals based on a count value.

In addition, the count value 2 is an accumulation of count values for each of the two frames, for judging the start of the next sector.

Data detected for each of the two frames is normally input three times; that is, data corresponding to the address data recording region is normally detected at an interval of two frames as shown therein, and LPP position lock signal is internally generated.

Figure 9:
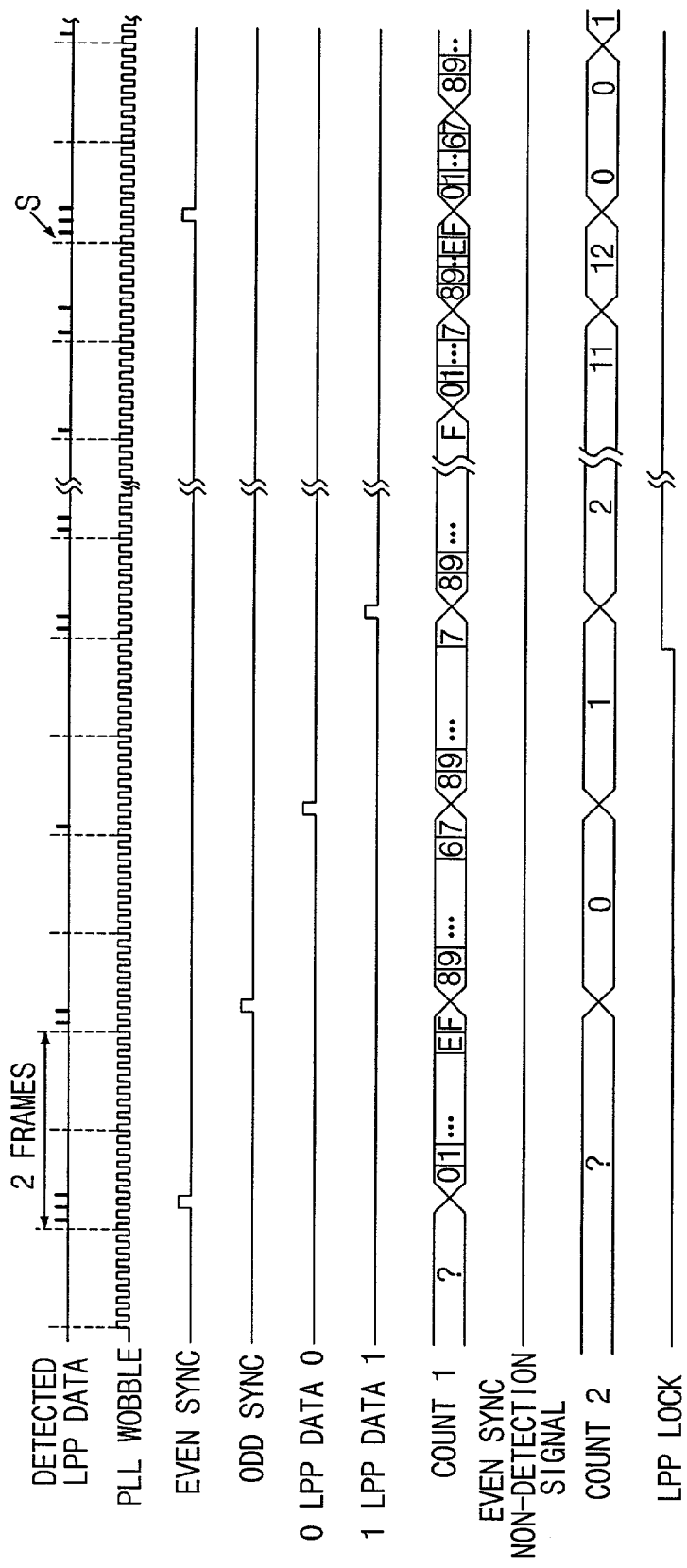
FIG. 9 is a timing diagram explaining another example of the signal processing process in the signal control unit of FIG. 2.

FIG. 9 is a timing diagram explaining one example of the signal processing process in the signal control unit of FIG. 2.

As shown in the drawings, with regard to a window (not shown) generated in synchronization with a PLL_wobble signal, land pre-pit(LPP) data 111 is generated from a second frame, the synchronization protection processing unit 34 generates an even sync. This synchronization signal corresponds to a signal that cannot be presently confirmed. Afterwards, a data detected after a second frame is 110, and accordingly an odd sync is generated.

Afterwards, one or more "1s" are detected from three bits of the expected position (S; 12-th interval of count 2) of the even sync which is the 25-th frame after the odd sync generation position. Therefore, an even sync signal indicating that an even sync is started in the 25-th frame is generated, and a frame count corresponding to the start of a new sector is started. At this time, it can be known that the odd sync is an accurate value among synchronization signals of the previous sector.

It is shown that the remaining signals are executed by the same method as illustrated in FIG. 8.

Figure 10:
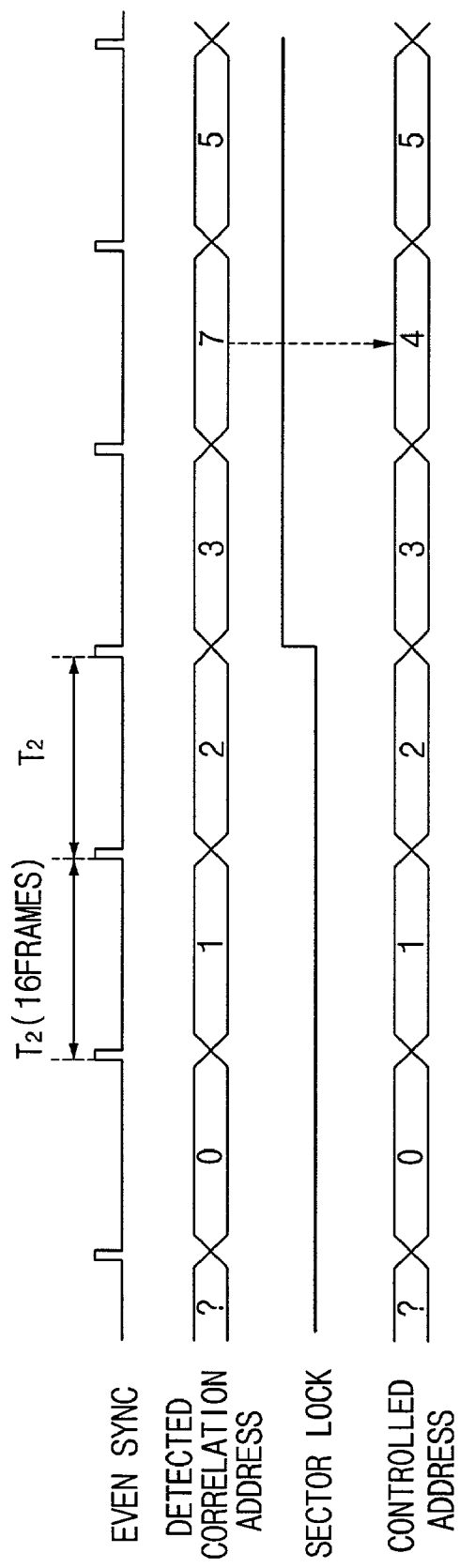
FIG. 10 is a timing diagram explaining a process of controlling an address value detected during an even synchronization in the signal control unit of FIG. 2.
Figure 11:
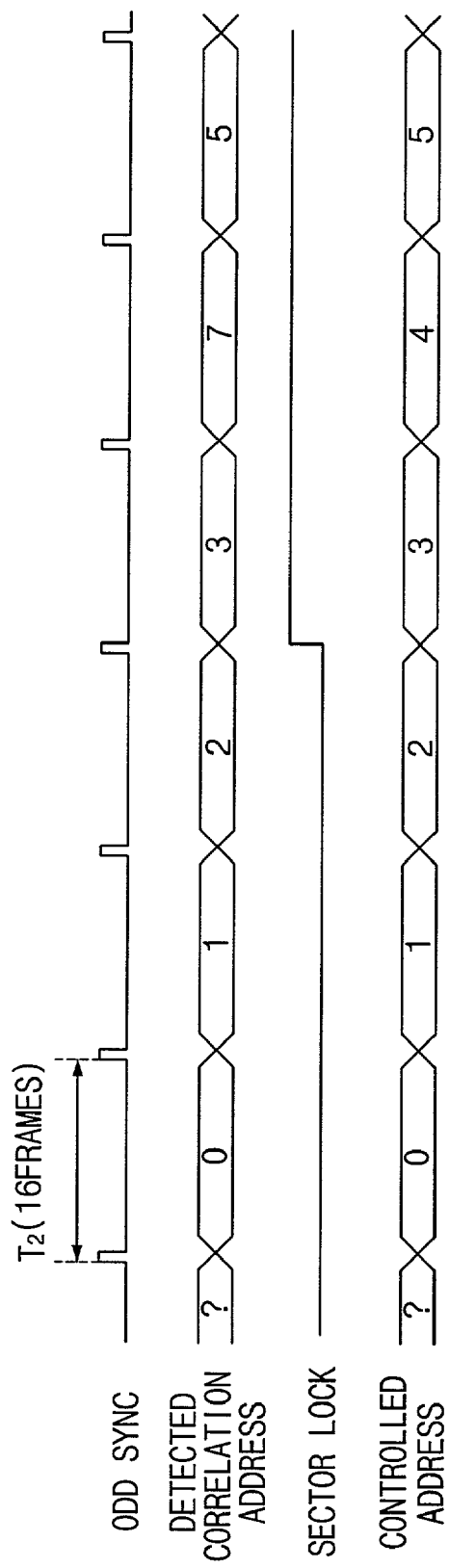
FIG. 11 is a timing diagram illustrating a process of controlling an address value detected during an odd synchronization in the signal control unit of FIG. 2.

FIGS. 10 and 11 show the control of a correlation address detected by generating a synchronization lock (sector lock) signal when an even or odd sync is generated three times in succession.

An address value detected after a correlation address value 3 is controlled to become 4 so that it maintains continuity, and is output from the correlation address control unit 36.

When utilizing the above-described disk player for exclusive use in recording, the system processing unit 50 controls the light source driving unit 17 so that user data is recorded on the disk 60 with reference to the address value output after the synchronization lock signal generation.

On the other hand, when utilizing the disk player for exclusive use in reproduction, the system processing unit 50 corrects the detected data according to a synchronization signal to thus reproduce the same.

As described above, in accordance with the disk player of the present invention, since the detection of a synchronization signal can be performed more precisely, an error in the recording and reproduction of data can be reduced.

Although the preferred embodiments of the present invention have been described, it is understood that the present invention should not be limited to this preferred embodiments but various changes and modifications can be made by one skilled in the art within the spirit and scope of the present invention as hereinafter claimed.

What is claimed is:

1. A disk player, which records information on a disk and/or reproduces recorded information, comprising:
    a wobble detection unit for detecting a wobble signal corresponding to a wobbling pattern formed along a track of the disk;
    an information processing unit for detecting a pre-pit signal recorded on the disk using the wobble signal output from the wobble detection unit and a clock signal output from the wobble detection unit, the clock signal obtained by multiplying the wobble signal a first predetermined number of times, and for processing the information recorded on the disk or the information to be recorded thereon, according to the detected pre-pit signal; and
    a window generation unit for counting the clock signal in synchronization with an edge of the wobble signal and generating a window signal used by the information processing unit for detecting the pre-pit signal when the count of the clock signal reaches a predetermined count value.

2. The disk player of claim 1, wherein the information processing unit comprises:
    a reproduction signal processing unit for converting a reproduction signal picked up from the disk into a digital signal; and
    a signal control unit for generating a window at the detection of the pre-pit signal corresponding to the wobble signal output from the wobble detection unit and the clock signal, picking up data output from the reproduction signal processing unit during a window generation, and correcting the picked up data.

3. The disk player of claim 2, wherein the signal control unit comprises:
    a data detection unit for picking up the digital signal from the reproduction signal processing unit during the window generation to output the same;
    a synchronization detection unit for detecting a synchronous signal from data output from the data detection unit and outputting the synchronous signal; and
    a synchronization protection processing unit for outputting a synchronization lock signal if the synchronous signal output from the synchronization detection unit is normally generated as much as a second predetermined number of times; and
    a correlation address control unit for controlling address information corresponding to a value output from the data detection unit according to the synchronization lock signal.

4. The disk player of claim 3, wherein the signal control unit further comprises:
    a data conversion unit for decoding the digital signal output from the data detection unit to output the same to the correlation address control unit; and a data processing unit for processing data output from the data conversion unit in a recording format.

5. The disk player of claim 4, wherein the data conversion unit converts a code of three bits into a corresponding single bit and outputs the corresponding single bit.

6. The disk player of claim 4, wherein the synchronization protection processing unit generates the synchronization lock signal when a synchronization signal is normally input twice.

7. The disk player of claim 4, wherein the correlation address control unit controls a detected address value to conform to a predetermined increasing pattern when the synchronization lock signal is maintained.

8. The disk player of claim 1, wherein the window signal is generated in accordance with a predetermined counter value corresponding to the clock signal.

9. The disk player of claim 8, wherein the counter value is reset at consecutive edges of the wobble signal.

10. The disk player of claim 8, wherein the counter value is reset at consecutive rising edges of the wobble signal.

11. The disk player of claim 1, wherein the window signal is one clock cycle long.

12. The disk player of claim 1, wherein the window signal is two clock cycles long.

13. A disk player, which records information on a disk and/or reproduces recorded information, comprising: a wobble detection unit for detecting a wobble signal corresponding to a wobbling pattern formed along a track of the disk; and an information processing unit for detecting a pre-pit signal recorded on the disk using the wobble signal output from the wobble detection unit and a clock signal obtained by multiplying the wobble signal by a first predetermined number of times, and for processing the information recorded on the disk or the information to be recorded thereon, according to the detected pre-pit signal, wherein the information processing unit comprises: a reproduction signal processing unit for converting a reproduction signal picked up from the disk into a digital signal; and a signal control unit for generating a window at the detection of the pre-pit signal corresponding to the wobble signal output from the wobble detection unit and the clock signal, picking up data output from the reproduction signal processing unit during a window generation, and correcting the picked up data, and wherein the signal control unit comprises: a data detection unit for picking up the digital signal from the reproduction signal processing unit during the window generation to output the same; a synchronization detection unit for detecting a synchronous signal from data output from the data detection unit and outputting the synchronous signal; and a synchronization protection processing unit for outputting a synchronization lock signal if the synchronous signal output from the synchronization detection unit is normally generated as much as a second predetermined number of times; and a correlation address control unit for controlling address information corresponding to a value output from the data detection unit according to the synchronization lock signal.

14. The disk player of claim 13, wherein the signal control unit further comprises: a data conversion unit for decoding the digital signal output from the data detection unit to output the same to the correlation address control unit; and a data processing unit for processing data output from the data conversion unit in a recording format.

15. The disk player of claim 14, wherein the data conversion unit converts a code of three bits into a corresponding single bit and outputs the corresponding single bit.

16. The disk player of claim 14, wherein the synchronization protection processing unit generates the synchronization lock signal when a synchronization signal is normally input twice.

17. The disk player of claim 14, wherein the correlation address control unit controls a detected address value to conform to a predetermined increasing pattern when the synchronization lock signal is maintained.

18. The disk player of claim 1, wherein the first predetermined number of times is greater than one.

* * * * *